(12) United States Patent
Zizka et al.

(10) Patent No.: US 11,516,415 B2
(45) Date of Patent: Nov. 29, 2022

(54) METHODS AND APPARATUS FOR AMBIENT LIGHT SUPPRESSION WITH SUBTRACTIVE IMAGE SENSOR

(71) Applicant: Photoneo s. r. o., Bratislava (SK)

(72) Inventors: Jan Zizka, Ziar nad Hronom (SK); Tomas Kovacovsky, Bratislava (SK); Michal Maly, Lutila (SK)

(73) Assignee: PHOTONEO S.R.O., Bratislava (SK)

( * ) Notice: Subject to any disclaimer, the term of this patent is extended or adjusted under 35 U.S.C. 154(b) by 0 days.

(21) Appl. No.: 17/554,820

(22) Filed: Dec. 17, 2021

(65) Prior Publication Data
US 2022/0124265 A1  Apr. 21, 2022

Related U.S. Application Data

(63) Continuation of application No. PCT/IB2020/055569, filed on Jun. 15, 2020.
(Continued)

(51) Int. Cl.
H04N 5/357 (2011.01)
H04N 5/351 (2011.01)
(Continued)

(52) U.S. Cl.
CPC ............. H04N 5/357 (2013.01); H04N 5/351 (2013.01); H04N 5/3745 (2013.01)

(58) Field of Classification Search
CPC ...... H04N 5/351; H04N 5/357; H04N 5/3745; H04N 5/347; H04N 5/3651; H04N 13/254;
(Continued)

(56) References Cited

U.S. PATENT DOCUMENTS 8,492,699 B2 * 7/2013 Zheng ................... H01L 27/144
                                                                250/214 A
10,158,844 B2 * 12/2018 Kovacovsky ........... G01S 7/493
(Continued)

FOREIGN PATENT DOCUMENTS

EP         3220627 A1     9/2017

OTHER PUBLICATIONS

Bipolar junction transistor Wikipedia last edited Dec. 4, 2021 Accessed at https://en.wikipedia.org/w/index.php?title=Bipolar_junction_transistor&action=history, 13 pages.
(Continued)

Primary Examiner — Marly S Camargo
(74) Attorney, Agent, or Firm — Smith Baluch LLP

(57) ABSTRACT

The effect of ambient light on a measurement taken by an imaging pixel may be reduced by employing two optical filters. The two filters may have narrow passbands that are close to each other but do not overlap. The first filter may allow ambient and active light to pass. The second filter may allow ambient light to pass but may block active light. The ambient and active light that passes through the first filter may cause electrical charge to be generated in a photodiode of the pixel. The ambient light that passes through the second filter and strikes another pixel element may control the amperage of an electrical current that depletes charge from the photodiode. For instance, the other element may be a photoresistor, the light-dependent resistance of which controls the amperage, or may be a second photodiode that generates charge that controls a transistor that controls the amperage.

23 Claims, 4 Drawing Sheets

Related U.S. Application Data

(60) Provisional application No. 62/862,374, filed on Jun. 17, 2019.

(51) Int. Cl.
    *H04N 5/374*     (2011.01)
    *H04N 13/254*     (2018.01)
    *G01S 17/10*     (2020.01)
    *H04N 5/365*     (2011.01)
    *H01L 27/146*     (2006.01)
    *H04N 5/3745*     (2011.01)

(58) Field of Classification Search
CPC ... H01L 27/14681; G01S 17/10; G01J 1/4204
See application file for complete search history.

(56) References Cited

U.S. PATENT DOCUMENTS

| | | | |
|---|---|---|---|
| 10,182,190 B2 * | 1/2019 | Nakanishi | H04N 5/241 |
| 10,542,246 B2 * | 1/2020 | Kovacovsky | H04N 13/218 |
| 2011/0068255 A1 | 3/2011 | Zheng et al. | |
| 2017/0195589 A1 * | 7/2017 | Kovacovsky | G01S 17/89 |
| 2018/0003806 A1 | 1/2018 | Inui | |
| 2019/0082163 A1 * | 3/2019 | Kovacovsky | H04N 1/218 |
| 2019/0335074 A1 * | 10/2019 | Malkes | H04N 5/225 |

OTHER PUBLICATIONS

International Search Report and Written Opinion in International Application No. PCT/IB2020/055569 dated Sep. 29, 2020, 10 pages.

\* cited by examiner

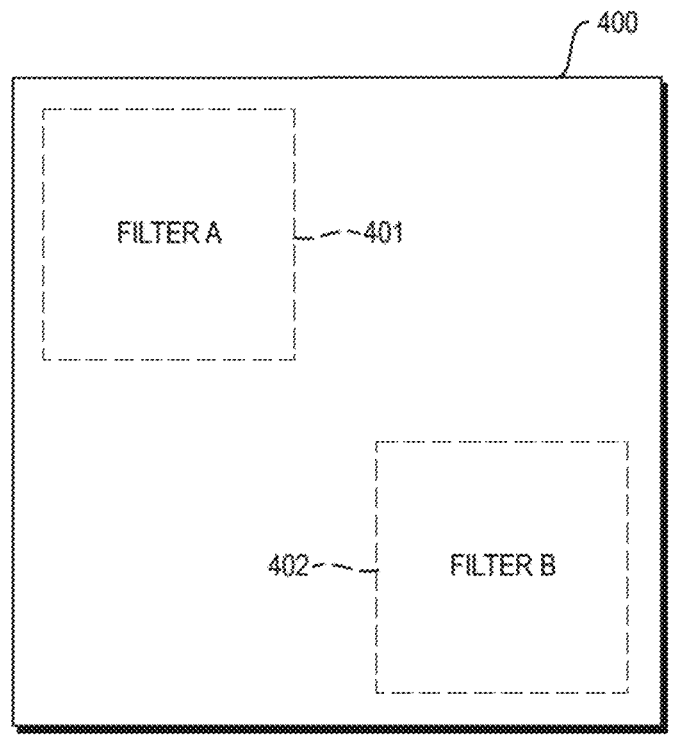
FIG. 4
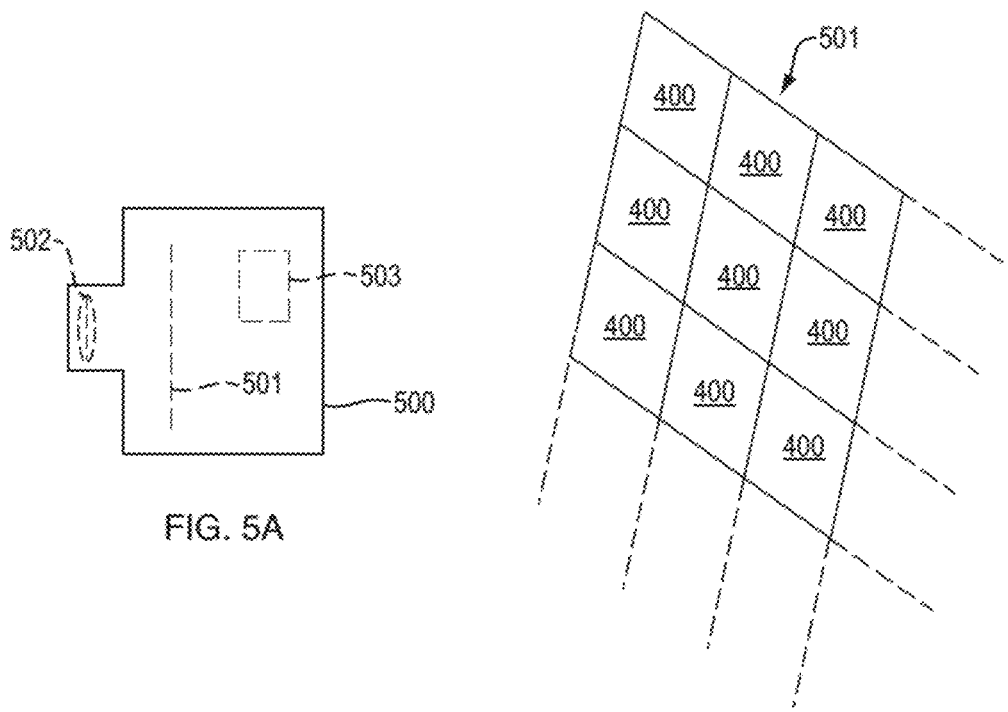
FIG. 5A
FIG. 5B

METHODS AND APPARATUS FOR AMBIENT LIGHT SUPPRESSION WITH SUBTRACTIVE IMAGE SENSOR

RELATED APPLICATIONS

This application is a by-pass continuation of International Application No. PCT/IB2020/055569 filed Jun. 15, 2020, which claims the priority of the filing date of U.S. Provisional Patent Application No. 62/862,374 filed Jun. 17, 2019, the entire disclosure of each of which is herein incorporated by reference.

FIELD OF TECHNOLOGY

The present invention relates generally to ambient light suppression.

BACKGROUND

Many conventional imaging systems include an active light source, such as a laser or light-emitting diode (LED), which actively illuminates a scene. These conventional systems may control parameters (e.g., power, color, illumination pattern, and polarization) of the active illumination. Calibration is performed to determine these parameters of the active illumination. This calibration in turn facilitates computer vision.

Unfortunately, it is difficult to control these parameters for ambient light. For purposes of image processing, ambient light is typically noise. Therefore, in many situations, it is desirable to minimize the effect of ambient light on the image being captured.

In some conventional imaging systems, ambient light is digitally suppressed during imaging processing. This digital suppression is achieved, in these conventional systems, by: (a) using an imaging sensor to capture a first image of a scene that is illuminated by both active light and ambient light (Image A); (b) using the same sensor to capture a second image of the scene that is illuminated by only the ambient light (Image B), and (c) subtracting the second image from the first image to produce an image (Image C) in which ambient light has been digitally suppressed (Image A−Image B=Image C). This digital image subtraction is typically performed in a pixelwise manner.

In some conventional imaging systems, ambient light is physically suppressed by a physical, narrow-band filter. For instance, if the active light source emits narrowband illumination centered at X nm, the imaging sensor may be covered with an optical filter with a narrow bandwidth of 2 nm and with cutoff frequencies at X+1 nm and X−1 nm. The sun radiates at all visible wavelengths with a large power (e.g., an irradiance of 1000 W/m2). The narrow optical filter may allow only a small percentage of the ambient solar radiation to pass, but may allow almost all of the active illumination to pass.

However, these conventional methods of suppressing ambient light have three problems.

First, in both of these conventional methods (digital suppression and physical suppression), if the ambient light is too strong, then the full-well capacity of the photodiodes is saturated.

Second, in both of these conventional methods (digital suppression and physical suppression), if the ambient light is too strong, then the signal-to-noise ratio (SNR) may be too low. This may occur, for instance, where there is a practical upper limit on the power of the active illumination. For instance, the power of the active illumination may be limited by safety concerns, power constraints or other hardware constraints.

Third, in the conventional digital suppression method described above, if the scene is not completely static, then the scene changes between Image A and Image B. This in turn may cause artifacts (e.g., "ghosts") to appear in Image C, which is calculated by subtracting Image B from Image A.

SUMMARY

In illustrative implementations of this invention, all three of these problems are greatly mitigated. In illustrative implementations of this invention, the full-well capacity of the photodiode does not saturate—and the SNR is acceptable—even at dramatically higher powers of ambient illumination than the existing digital or physical suppression methods can handle. Also, in illustrative implementations, ambient light suppression is achieved without image "ghosts" even for a scene that is rapidly changing. Furthermore, in illustrative implementations, SNR is acceptable even at much higher powers of ambient illumination than conventional digital or physical suppression methods can handle.

In illustrative implementations, this invention leverages the fact that the power of ambient light is substantially equal in two narrow frequency ranges that are very close to each other but do not overlap.

For instance, in some implementations of this invention, a narrowband active light source (e.g., laser or narrowband LED) illuminates the scene. Each pixel of the imaging sensor may include two narrow bandpass optical filters. The first filter's bandpass may be centered on, or may include, the frequency of the active illumination. Thus both active light and ambient light may pass through the first filter. The second filter's bandpass may be very close to, but not overlap, that of the first filter. Because the second filter's bandpass does not overlap that of the first filter, active light may be blocked by the second filter, while ambient light passes through the second filter. Because the two bands are very close to each other, the power of the ambient light that passes through the two filters may be substantially equal. Ambient light that passes through the second filter may cause electrical charge that is building up in the photodiode under the first filter to be constantly or frequently discharged from that photodiode, in an amount proportional to the ambient light that passes through the second filter. Thus, the effect of the ambient light may be removed (or subtracted) from the light measurements.

The present invention performs better than the conventional ambient light suppression methods described in Background section above, for at least three reasons:

First, these conventional methods (digital suppression and physical suppression) are both prone to saturation of the full-well capacity of the sensor's photodiodes as ambient light power increases. In contrast, in the present invention, the imaging sensor can tolerate a dramatically higher level of power of ambient light. This is because, in the present invention, the effect of ambient light may be negated by constantly or frequently discharging (e.g., from a photodiode or floating diffusion) electrical charge that is building up due to ambient light. This, in turn, may cause the stored charge in the photodiode to never exceed full-well capacity.

Likewise, in the present invention (unlike the conventional digital and physical suppression methods discussed above), SNR may be acceptably high even though ambient light power is very large. Again, this is because, in the present invention, the effect of ambient light may be negated by constantly or frequently discharging (e.g., from a photodiode or floating diffusion) electrical charge that is building up due to ambient light.

Furthermore, in the present invention (unlike the conventional digital suppression method described above), an image of a rapidly changing scene may be captured without artifacts that would occur if two images taken at different times were used to suppress ambient light. This is because, in the present invention, the measurements of ambient and active light may occur simultaneously.

The Summary section and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

In FIG. 1, the pixel includes two photodiodes. In FIGS. 2 and 3, the pixel includes a photodiode and an LDR (light-dependent resistor).

FIG. 4 is a top view of a pixel that includes two optical filters.

FIG. 5A shows a camera.

FIG. 5B shows an imaging sensor of a camera.

Figure 1:
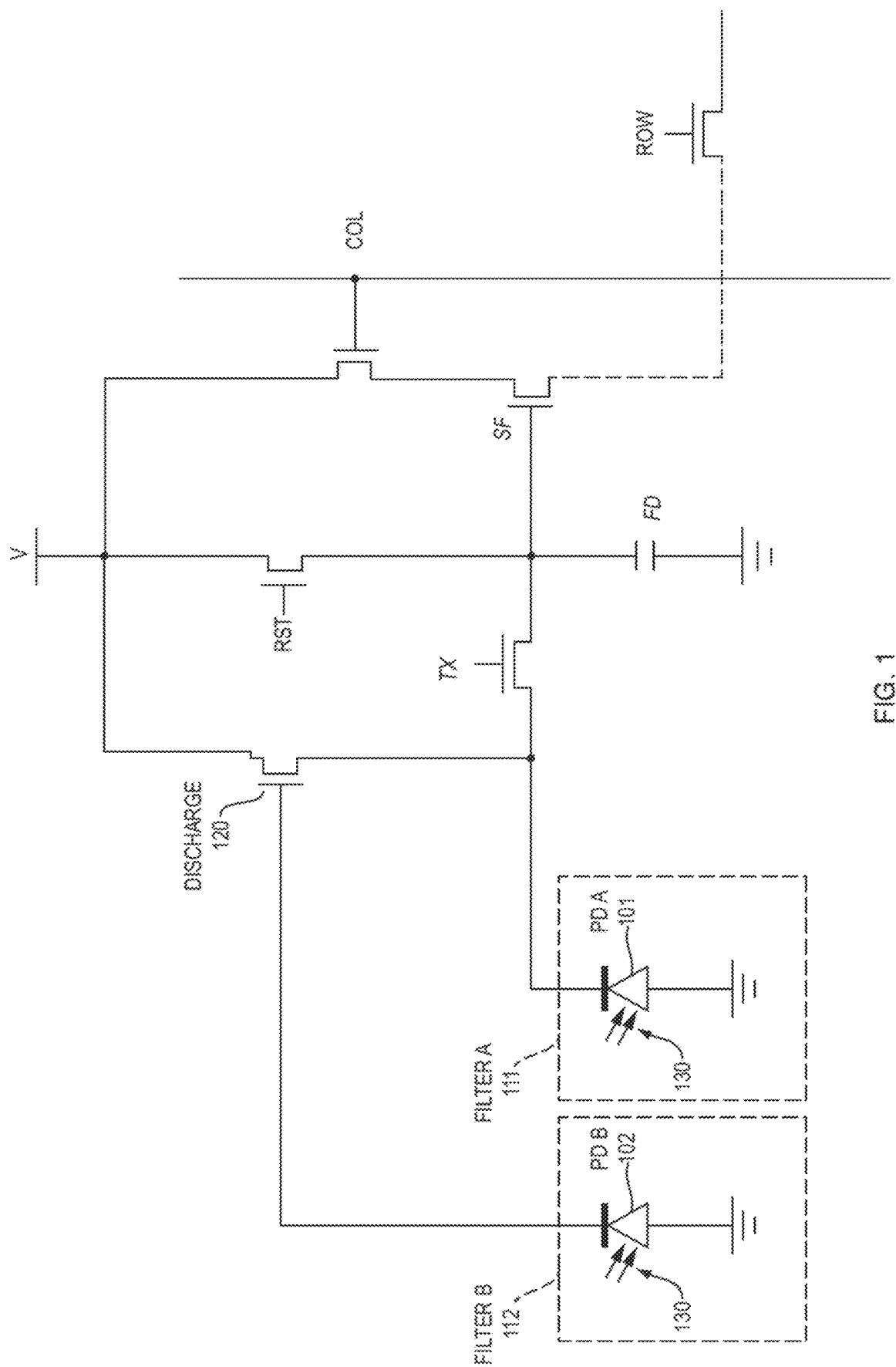
FIGS. 1, 2 and 3 are each a circuit schematic that shows a pixel of a CMOS (complementary metal-oxide-semiconductor) image sensor circuit.

The above Figures are not necessarily drawn to scale. The above Figures show illustrative implementations of this invention. The examples shown in the above Figures do not limit this invention. This invention may be implemented in many other ways.

DETAILED DESCRIPTION

Optical Filters

In some implementations of this invention, each pixel of the imaging sensor includes two optical filters (which we sometimes call filter A and filter B) and two photodiodes (which we sometimes call PDA and PDB). Filter A may cover photodiode PDA, in such a way that light measured by photodiode PDA passes through filter A but not through filter B. Likewise, filter B may cover photodiode PDB, in such a way that light measured by photodiode PDB passes through filter B but not through filter A.

Alternatively, in some implementations, each pixel of the imaging sensor includes two optical filters (filter A and filter B), a photodiode PD and an LDR (light-dependent-resistor, also known as photoresistor). The resistance of the LDR may decrease as the irradiance incident on the LDR increases. Filter A may cover photodiode PD, in such a way that light measured by photodiode PD passes through filter A but not through filter B. Likewise, filter B may cover the LDR, in such a way that light which affects the resistance of the LDR passes through filter B but not through filter A.

Filters A and B may each be narrow bandpass filters (e.g., with a wavelength bandwidth of less than 10 nm, or less than 5 nm, or less than 4 nm, or less than 3 nm, or less than 2 nm, or less than 1 nm).

The passband of filter A may be centered on, or may include, the center frequency of the active illumination. Thus, filter A may allow a large portion of the active illumination that is incident on filter A to pass through filter A. Filter A may also allow a small portion of the ambient light to pass through filter A (specifically, the small portion of the ambient light that is incident on filter A and that is in the narrow bandpass of filter A.)

The passband of filter A may be very close to, and yet not overlap, the passband of filter B.

The following three paragraphs list non-limiting examples of the passbands of two filters being "very close" to each other.

In some cases, the passbands of two filters are "very close" to each other in the sense that the irradiance of ambient light that passes through the first passband differs from the irradiance of ambient light that passes through the second passband by less than 25%, or less than 20%, or less than 15%, or less than 10%, or less than 5%, or less than 4%, or less than 3%, or less than 2%, or less than 1%.

In some cases, the passbands of two filters are "very close" to each other in the sense that the difference between the lower cutoff wavelength of the first passband (wavelength A) and the upper cutoff wavelength of the second passband (wavelength B) is less than 50 nm, or less than 40 nm, or less than 30 nm, or less than 20 nm, or less than 10 nm. For purposes of the preceding sentence, wavelength A is longer than wavelength B.

In some cases, the passbands of two filters are "very close" to each other in the sense that—for each of multiple, commonplace spectral illumination profiles—power of light passing through the first filter does not differ by more than 10% from power of light passing through the second filter. For instance, the passbands of the two filters may be "very close" to each other where, for each of the following 12 illumination scenarios, power of light passing through the first filter does not differ by more than 10% from power of light passing through the second filter. These twelve illumination scenarios are reflected light that is incident on the two filters and that has reflected from (1) wood plate illuminated by solar radiance; (2) metal plate illuminated by solar radiance; (3) paper sheet illuminated by solar radiance; (4) textile sheet illuminated by solar radiance; (5) plastic plate illuminated by solar radiance; (6) leather sheet illuminated by solar radiance; (7) RAL 1026 Luminous yellow sheet illuminated by solar radiance; (8) RAL 2005 Luminous orange sheet illuminated by solar radiance; (9) RAL 3024 Luminous red sheet illuminated by solar radiance; (10) RAL 4008 Signal violet sheet illuminated by solar radiance; (11) RAL 5005 Signal blue sheet illuminated by solar radiance; and (12) RAL 6038 Luminous green sheet illuminated by solar radiance, respectively. In the preceding sentence, "RAL" refers to the RAL color standard.

The following four paragraphs list non-limiting examples of the passbands of two filters that do not overlap each other.

In some cases, the passband of filter A and the passband of filter B are "not overlapping" (as that phrase is used herein) in the sense that irradiance of active light that passes through filter B is less than 25%, or less than 20%, or less than 15%, or less than 10%, or less than 5%, or less than 4%, or less than 3%, or less than 2%, or less than 1% of the irradiance of active light that passes through filter A.

In some cases, the passband of a first filter and the passband of a second filter are "not overlapping" (as that phrase is used herein) in the sense that the passband of the first filter does not include any of the frequencies that are in the passband of the second filter.

In some cases, the passband of a first filter and the passband of a second filer are "not overlapping" (as that phrase is used herein) in the sense that the power of light that would pass through a serial configuration of the two filters differs by more than 5% from the power of light that would pass through only one of the filters. In the preceding sentence, a "serial configuration" of two filters means a physical arrangement of the two filters wherein light passes through one of the filters then through the other filter. Two filters that are not in a serial configuration may be "not overlapping" in the sense described in this paragraph, as long as they would, if arranged in a serial configuration, satisfy the first sentence of this paragraph.

In some cases, the passband of a first filter and a passband of a second filter are "not overlapping" (as that phrase is used herein) in the sense that the lower cutoff wavelength of the first passband (wavelength A) differs from the upper cutoff wavelength of the second passband (wavelength B) by at least 40 nm, or by at least 30 nm, or by at least 20 nm, or by at least 10 nm, or by at least 5 nm. For purposes of the preceding sentence, wavelength A is longer than wavelength B.

Narrow-Band Active Light Source

In some cases, the active light source (e.g., laser or LED) is narrowband in the sense that the bandwidth of the active light emitted by the active light source is less than or equal to twice the bandwidth of the filter that passes the active light. For purposes of the preceding sentence, to say that the filter "passes" the active light means that the filter attenuates the active light by less than 60 percent, or less than 50 percent, or less than 40 percent, or less than 30 percent, or less than 20 percent, or less than 10 percent, or less than 5 percent.

In some implementations, the active light source (e.g., laser or LED) is narrowband in the sense that bandwidth of the active light emitted by the active light source is less than 1 nm, or less than 2 nm, or less than 3 nm, or less than 4 nm, or by less than 5 nm, or by less than 10 nm, or by less than 15 nm, or by less than 20 nm, or by less than 25 nm, or by less than 30 nm, or by less than 35 nm, or by less than 40 nm, or by less than 50 nm.

Hardware and Functionality

In some implementations, the hardware of this invention includes a camera and an active light source (e.g., a laser or LED). The camera may include a special image sensor.

The special image sensor may comprise special pixels. Every special pixel may have two regions: (1) a first region (Region A) covered by a first optical band-pass filter (filter A); and (b) a second region (Region B) covered by a second optical band-pass filter (filter B).

The passband for filter A may be chosen in such a way that the active illumination passes through filter A with a transmittance of more than 0.9, or more than 0.8, or more than 0.7 or more than 0.6, or more than 0.5, or more than 0.4.

The passband for filter B may be chosen in such a way that: (a) ambient light passes through filter B; and (b) active light does not pass through filter B.

In some cases, the passband of filter B is very close to, but does not overlap, the passband of filter A.

In a prototype of this invention: (a) the narrowband active light source emits light at 636 nm; (b) filter A has a narrow passband of 636 nm plus or minus 1 nm; and (c) the passband of filter B is 639 nm plus or minus 1 nm. The irradiance of ambient light at 639 nm is similar to at 636 nm. Thus, in this prototype, light passed by filter B may be used to approximate (and negate) the effect of the ambient light passed by the filter A.

First Embodiment: In a first embodiment of this invention, the pixel electrical circuit comprises: (a) photodiode A (PDA); photodiode B (PDB); (c) transistor DISCHARGE; (d) floating diffusion FD; (e) transfer gate transistor TX; (f) reset transistor RST; (g) source follower transistor SF; (h) column transistor COL; and (i) for each row, row transistor ROW.

In this first embodiment, photodiode A may be in the region covered by filter A. Filter A may have a narrow passband that includes the wavelength of the active light. Filter A may allow active light to pass. Filter A may also allow a small amount of ambient light to pass (primarily in the passband of filter A). It is desirable to eliminate the effect of the small amount of ambient light that passes through filter A.

In this first embodiment, photodiode B (PDB) may be in the region covered by filter B. Filter B may be an optical narrow-pass filter with the passband very close to the passband of filter A, but not overlapping with it. Thus, filter B may block all or almost all active light.

In this first embodiment, photodiode B may be connected to the base of transistor DISCHARGE. A voltage source may be connected to the collector of transistor DISCHARGE. Floating diffusion FD may be connected to a terminal of transistor DISCHARGE (e.g., to an emitter, if transistor DISCHARGE is a BJT).

Here is a non-limiting example of this first embodiment. In this example: (a) the bandpass of filter A is 636 nm plus or minus 1 nm; (b) the transmittance (idealized) of filter A for wavelengths in the interval <635,637>nm is 1; (c) the transmittance (idealized) of filter A for the other wavelengths is 0; (d) the bandpass of filter B is 645 nm plus or minus 2 nm; (e) the transmittance of filter B for wavelengths in the interval <643,637>nm is 0.5; and (f) the transmittance (idealized) of filter B for the other wavelengths is 0.

FIG. 1 shows another non-limiting example of this first embodiment (with two photodiodes).

In this first embodiment, photodiode A and photodiode B may be connected in such a way that charge generated in Photodiode B causes depletion of charge in Photodiode A.

Second Embodiment: In a second embodiment of this invention, hardware of the pixel electrical circuit comprises: (a) photodiode A (PDA); (b) light-dependent resistor (LDR)); (c) floating diffusion FD; (d) transfer gate transistor TX; (e) reset transistor RST; (f) source follower transistor SF; (g) column transistor COL; and (h) for each row, row transistor ROW. Another name for the light-dependent resistor is a photoresistor.

In this second embodiment, the LDR is in the region covered by filter B. The filter B is an optical narrow-pass filter with the passband very close to, but not overlapping, the passband of filter A. For instance, in some cases, the passband of filter A does not include any of the frequencies in the passband of FIG. B. Filter B may block all or almost all active light.

Figure 2:
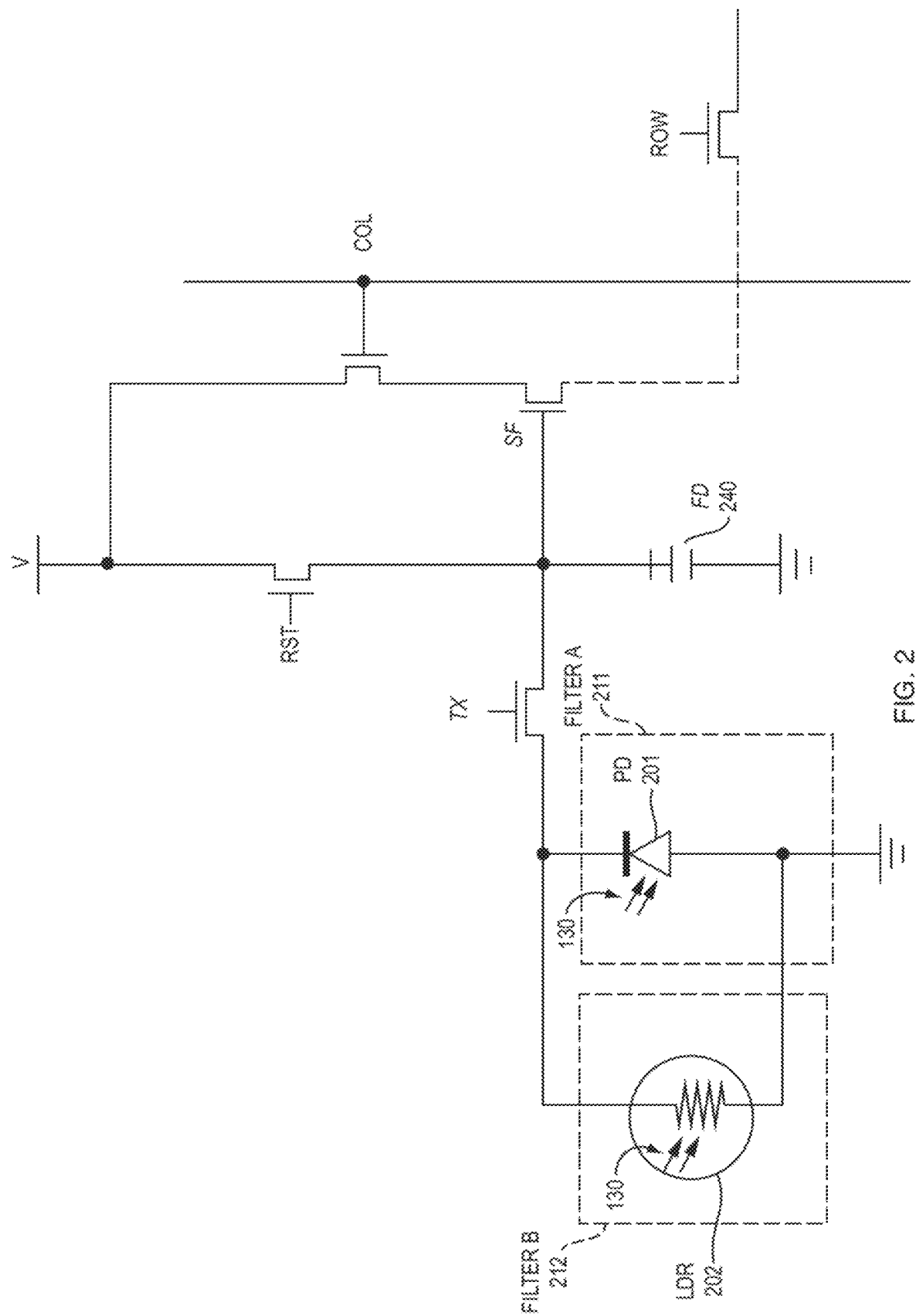
Figure 3:
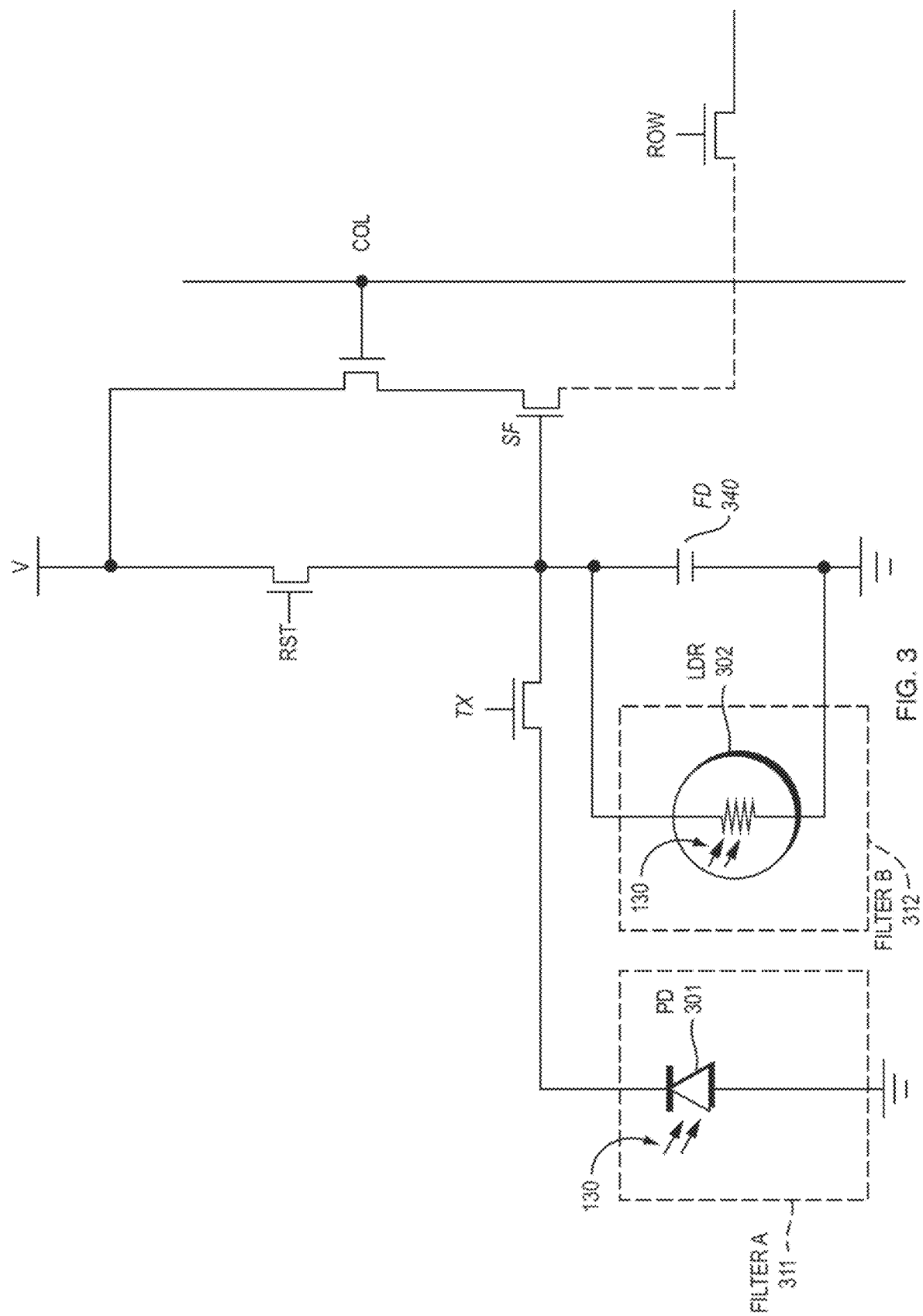

Non-limiting examples of this second embodiment (with an LDR) are shown in FIGS. 2 and 3.

In this second embodiment, the other pixel circuit components (e.g., PDA, transistor DISCHARGE, FD, TX, RST, SF, COL, and ROW) may have the same hardware and functionality as in the first embodiment.

Third embodiment: In a third embodiment, each optical filter is implemented directly in the photodiodes (for example, by having different silicone depth).

The image sensor may have pre-defined settings (same for all pixels) of optical properties of filter A and filter B, including their respective optical bands.

An advantage of the present invention is that, in illustrative implementations, a large amount of ambient light will not cause full-well saturation. Instead, the charge generated by ambient light may be neutralized (discharged). Thus, the difference of two signals (active light—ambient) may be effectively computed without saturating full-well capacity, as it would happen in a standard image sensor.

The following two paragraphs describe an example of how ambient light suppression in an illustrative implementation of the invention may be modeled.

This model assumes that the bands of filter A and filter B are close. Further, the model assumes that one photon of light (which is allowed to pass filter A and is captured by Photodiode A) and another photon of light (which is allowed to pass filter B and is captured by Photodiode B) cause the same number of electron(s) of charge to be stored in their respective photodiodes.

This model also assumes that ambient light intensity is the same in the passband of filter A and in the passband of filter B. This is true, for example, for idealized solar radiance where the idealized irradiance curve in the visible spectrum is flat. We can assume, for example, that the difference for irradiance at wavelengths w1 and w2 is negligible if both w1, w2 are in the visible spectrum and w1, w2 do not differ by more than a small amount (e.g., by no more than 50 nm).

The model described in the preceding two paragraphs is a non-limiting example. This invention may be implemented in different ways and may be modeled with different models.

In some cases, the transmittances are set in such a way that:

$$\frac{\text{transmittance of Filter } B \text{ for passing frequencies}}{\text{transmittance of Filter } A \text{ for passing frequencies}} = \frac{\text{bandwidth of Filter } A(\text{in nanometers})}{\text{bandwidth of Filter } B(\text{in nanometers})}$$

In many cases, the transmittance of both filters is 0 (or less than 0.05) for wavelengths outside of their passbands.

In another embodiment, multi-band-pass filter(s) are employed. For instance, filter A may be a one-band narrow pass filter passing wavelengths 635-637 nm and filter B may be a filter passing wavelengths of 632-634 nm and wavelengths 638-640 nm. This is advantageous since the combination of two bands around the central band may be employed to better approximate the irradiance of the central band.

In FIG. 1: (a) filter A covers photodiode A (PDA) and allows both active light and ambient light to pass and to be measured by photodiode A; (b) filter B covers photodiode B (PDB) and allows ambient light to pass and to be measured by photodiode B; but (c) filter B does not allow active light to pass.

FIG. 1 shows a pixel of an CMOS image sensor, which pixel includes two photodiodes. In the example shown in FIG. 1, charge is generated in photodiode B by incident ambient light, which in turn causes charge in photodiode A to be depleted from photodiode A via the DISCHARGE transistor, proportionally to the amount of charge that has built up in photodiode B.

In the example shown in FIG. 1: (a) charge builds up in photodiode B due to ambient light that has passed through filter B; (b) an electric current (which flows through transistor DISCHARGE from photodiode A) increases by an amount that is proportional to the charge in photodiode B; and thus (c) as charge builds up in photodiode B due to ambient light, electric current (which flows through transistor DISCHARGE from photodiode A) depletes charge in photodiode A by an amount that is proportional to the charge in photodiode B. In FIG. 1, this depletion of charge from photodiode A (in an amount proportional to charge built up in photodiode B due to ambient light) may occur continuously, in such a way that the full-well capacity (of the pixel in which photodiode A is located) is not exceeded, even if the ambient light power is increased dramatically. In FIG. 1, the electric current (which flows through transistor DISCHARGE from photodiode A) may be directly proportional to the amount of charge that has built up in photodiode B. In FIG. 1, the amount of charge that is depleted from photodiode A in a time period may be directly proportional to the amount of charge that builds up in photodiode B in that time period.

In the pixel shown in FIG. 1, filter A 111, filter B 112, photodiode A 101, photodiode B 102, and transistor DISCHARGE 120 are all components of the same pixel. In an image sensor that comprises pixels of the type shown in FIG. 1, the suppression of the effect of ambient light (by depleting charge that is generated by ambient light) may be performed in a pixelwise manner, in such a way that hardware components in each pixel perform the suppression for that pixel.

FIGS. 2 and 3 each show a pixel of a CMOS image sensor, which pixel includes a photodiode and a photoresistor (also known as light-dependent resistor).

In the example shown in FIG. 2, photodiode PD and photoresistor LDR are electrically connected. Specifically, in FIG. 2, photoresistor LDR is in parallel electrically with photodiode PD. In FIG. 2, incident ambient light passing through filter B causes resistance of photoresistor LDR to decrease, proportionally to the irradiance of the ambient light incident on photoresistor LDR. This in turn causes electrical current (which flows from photodiode PD to ground through the LDR) to increase, proportionally to the decrease in resistance in the LDR. This electrical current depletes charge from photodiode PD, proportionally to the irradiance of ambient light passing through filter B. In FIG. 2, this depletion of charge from photodiode PD may occur continuously, in such a way that full-well capacity (e.g., of a pixel in which the LDR is located) is not exceeded, even if the ambient light power is increased dramatically.

In the pixel shown in FIG. 2, filter A 211, filter B 212, photodiode PD 201 and photoresistor LDR 202 (and, in some cases, floating diffusion FD 240 and transfer gate TX) are all components of the same pixel. In an image sensor that comprises pixels of the type shown in FIG. 2, the suppression of the effect of ambient light (by depleting charge that is generated by ambient light) may be performed in a pixelwise manner, in such a way that hardware components in each pixel perform the suppression for that pixel.

In the example shown in FIG. 3, photodiode PD, photoresistor LDR and floating diffusion FD are electrically connected. Specifically, a portion of the circuit in FIG. 3 includes photoresistor LDR and floating diffusion FD, in such a way that photoresistor LDR is in parallel electrically with floating diffusion FD. Furthermore, in FIG. 3, photodiode PD is (when transfer gate TX allows current to flow) in parallel electrically with that portion of the circuit which includes both photoresistor LDR and floating diffusion FD. In FIG. 3, incident ambient light passing through filter B causes resistance of photoresistor LDR to decrease, proportionally to the irradiance of the ambient light incident on photoresistor LDR. This in turn causes electrical current (which flows from the floating diffusion FD to ground through the LDR) to increase, proportionally to the decrease in resistance in the LDR. This electrical current depletes charge from the floating diffusion FD, proportionally to the irradiance of ambient light passing through filter B. In FIG. 3, the depletion of charge from floating diffusion FD may occur continuously, in such a way that full-well capacity (e.g., of a pixel in which the FD is located) is not exceeded, even if the ambient light power is increased dramatically.

In the pixel shown in FIG. 3, filter A 311, filter B 312, photodiode PD 301 and photoresistor LDR 302 (and, in some cases, floating diffusion FD 340 and transfer gate TX) are all components of the same pixel. In an image sensor that comprises pixels of the type shown in FIG. 3, the suppression of the effect of ambient light (by depleting charge that is generated by ambient light) may be performed in a pixelwise manner, in such a way that hardware components in each pixel perform the suppression for that pixel.

In FIGS. 2 and 3, the amount of charge depleted from photodiode PD may be directly proportional to the irradiance incident on the LDR. In FIGS. 2 and 3, the electrical resistance of the LDR may be inversely proportional to the irradiance incident on the LDR. In FIG. 2, the electrical current (which flows from photodiode PD to ground through the LDR) may be directly proportional to the irradiance incident on the LDR. In FIG. 3, the electrical current (which flows from floating diffusion FD to ground through the LDR) may be directly proportional to the irradiance incident on the LDR. In FIGS. 1, 2 and 3, readout is from floating diffusion FD.

In FIGS. 1, 2 and 3, the electrical circuit also includes conventional circuit elements (including transfer gate TX, source follower transistor SF, and row and column selectors), which function in a manner that is well known in the art. These circuit elements may be dedicated to only a single pixel or may control or facilitate the operation of multiple pixels of the image sensor. Likewise, the floating diffusion FD in FIGS. 1, 2 and 3 may be dedicated to only a single pixel, or may control or facilitate the operation of multiple pixels of the image sensor.

In FIGS. 1, 2 and 3: (a) light 130 comprises ambient light and active light and strikes filters A and B; and (b) a portion of light 130 passes through filters A and B. In FIGS. 1, 2 and 3, filter A has a higher transmittance of active light than does filter B. Put differently, in those Figures, filter A transmits (allows to pass) a higher percentage of active light than does filter B. In FIGS. 1, 2, and 3, filter A's transmittance of ambient light is roughly equal to filter B's transmittance of ambient light. Put differently, in those Figures, filter A transmits (allows to pass) approximately the same percentage of ambient light as does filter B. In FIG. 1, light that passes through filter A 111 strikes photodiode A 101, and light that passes through filter B 112 strikes photodiode B 102. In FIGS. 2 and 3, light that passes through filter A (211, 311) strikes photodiode PD (201, 301). In FIGS. 2 and 3, light that passes through filter B (212, 312) strikes photoresistor LDR (202, 302).

FIG. 4 is a top view of a pixel 400 that includes two optical filters, filter A 401 and filter B 402. In some cases, pixel 400 is a CMOS pixel. In FIG. 4: (a) filters A and B are each narrowband; (b) the passbands of filter A and filter B are very close to each other, but are not overlapping; (c) filter A allows both ambient light and active light to pass; and (d) filter B allows ambient light to pass but blocks active light. In the pixel shown in FIG. 4, filters A and B may each cover two circuit elements (not shown in FIG. 4) of the pixel. In some cases, each of these two circuit element is a photodiode. In some other cases, these two circuit elements are a photodiode and a photoresistor. In yet other cases, these two circuit elements are a photodiode and any other circuit element (e.g., phototransistor) which has an electrical characteristic that depends on intensity of light incident on the circuit element. In some cases, these two circuit elements (which are covered by filter A and filter B, respectively) include (a) a first photodiode that is covered by filter A and (b) a circuit element (e.g., a photoresistor or a second photodiode) that is covered by filter B and that controls depletion of charge from the first photodiode (e.g., proportionally to the intensity of ambient light that passes through filter B).

In illustrative implementations of this invention, any type of optical filter (such as a dichroic filter, absorptive filter or gel filter) may be employed. For instance, each optical filter (e.g., 111, 112, 211, 212, 311, 312) may be a dichroic filter that comprises a substrate (e.g., glass) which is coated with multiple optical coatings that reflect some optical frequencies and that transmit other optical frequencies (allowing them to pass). Or, for instance, each optical filter (e.g., 111, 112, 211, 212, 311, 312) may be an absorptive filter that comprises a material (e.g., glass or plastic) mixed with organic or inorganic compounds that absorb certain optical frequencies.

In some implementations of this invention, the suppression of ambient light is performed in a pixelwise manner, where each pixel includes two different narrowband optical filters (e.g., filters A and B, as discussed above). For instance, within each pixel: (a) ambient light and active light which pass through a first optical filter of the pixel may generate electrical charge that is stored in a photodiode or floating diffusion of the pixel; and (b) ambient light that passes through a second optical filter of the pixel may indirectly control discharge of electrical charge from the photodiode or floating diffusion of the pixel (e.g., in such a way that the amount of electrical charge that is discharged is directly proportional to the irradiance of the ambient light that passes through the second filter).

In FIGS. 1, 2, 3 and 4: (a) Filter A may have a narrow passband that includes the wavelength of the active light; (b) Filter A may allow active light to pass; (c) Filter A may also allow a small amount of ambient light to pass (primarily in the passband of filter A); (d) Filter B may be an optical narrow-pass filter with the passband very close to the passband of filter A, but not overlapping with it; and (e) thus, filter B may block all or almost all active light.

In FIGS. 1, 2 and 3, the generation of electrical charge in a photodiode due to ambient light may occur simultaneously with the discharge of that electrical charge during each frame of the camera. For instance, in some cases, in FIGS. 1, 2, 3 and 4, the discharge occurs at all times during (and simultaneously with) the generation. Or, for instance, in other cases, in FIGS. 1, 2, and 3: (a) the generation occurs during each frame; and (b) the discharge occurs during only a portion of each frame (during a portion of the time period in which the generation occurs).

Each transistor that is described herein (or shown in FIG. 1, 2 or 3) may comprise a MOSFET or BJT. For instance, each transistor that is described herein (or shown in FIGS. 1, 2 and 3) may comprise a BJT that is an NPN transistor or a PNP transistor. Each electrical current in or through a transistor that is described herein may flow between emitter and collector of a BJT or between source and drain of a MOSFET.

FIG. 5A shows a camera 500 that includes an imaging sensor 501, lens 502, and computer processor 503. FIG. 5B shows a portion of the imaging sensor 501. Specifically, FIG. 5B shows a corner of the imaging sensor 501, which includes multiple imaging pixels 400. In FIGS. 5A and 5B, the suppression of the effect of ambient light may be performed in a pixelwise manner. Each of the pixels 400 in FIG. 5B may include two optical filters, a photodiode and either a second photodiode or LDR, as shown in FIGS. 1, 2, and 3.

In some cases: (a) the passband of each passband filter consists of a band of frequencies between a lower cutoff frequency of the passband and an upper cutoff frequency of the passband; (b) each of these cutoff frequencies occur at a half-power point of the passband; and (c) the bandwidth of the passband is the difference (in Hertz) between the upper and lower cutoff frequencies. In some implementations of this invention: (a) the bandwidth of active light emitted by an active light source is the difference (in Hertz) between the upper and lower cutoff frequencies of the band of frequencies emitted by the active light source; and (b) each of these cut-off frequencies occur at a half-power point of the band.

Balanced Discharge Current

In the example shown in FIG. 1, the gain of the DISCHARGE transistor may be set in such a way that the current flowing through the transistor (charge flowing per unit of time) is substantially equal to the charge generated per unit of time in photodiode A due to ambient light. This in turn may cause ambient light to have substantially no effect on the measurement of irradiance by photodiode.

As used herein, "balanced DISCHARGE current" means a current in the DISCHARGE transistor which is substantially equal to the charge generated per unit of time in photodiode A due to ambient light.

The amount of DISCHARGE transistor gain which achieves balanced DISCHARGE current may be determined in at least three ways: (1) by trial and error doping of the CMOS substrate of the DISCHARGE transistor; (2) by electric simulation in design software where the doping (of the CMOS substrate of the DISCHARGE transistor) is calculated theoretically; and (3) by calibrating with a constant ambient light.

Calibrating with a constant ambient light may involve: (a) illuminating the image sensor in FIG. 1 with a constant ambient light; (b) measuring $I_1$, which is the charge per unit of time generated in photodiode A; (c) measuring $I_2$, which is the current in the DISCHARGE transistor in the circuit shown in FIG. 1 when the gain of the DISCHARGE transistor is equal to 1 and the image sensor is being illuminated with the constant ambient light; and (d) setting the gain of the DISCHARGE transmitter equal to (or substantially equal to) $I_1/I_2$. Setting this gain may involve fabricating a CMOS transistor with proper doping corresponding to the desired gain.

Alternatively, in FIG. 1, a balanced DISCHARGE current may be achieved by changing the bandwidth of Filter B. For instance, in FIG. 1, filter B may be replaced by new filter B', in such a way that BD'=BD $(I_1/I_2)$, where BD' is the bandwidth of filter B' and where BD is the bandwidth of Filter B. In some cases, the passband of filter B' is very close to, but not overlapping, the passband of filter B. The bandwidth of filter B' may be wider than, or narrower than, the bandwidth of filter B.

Likewise, in FIG. 1, if $(I_1/I_2)<1$, then a balanced DISCHARGE current may be achieved by changing the transmittance of Filter B. For instance, in FIG. 1, if $(I_1/I_2)<1$, then filter B may be replaced by new filter B', in such a way that TC'=TC $(I_1/I_2)$, where TC' is the transmittance of filter B' and where TC is the transmittance of Filter B.

Likewise, in FIG. 1, if $(I_1/I_2)<1$, then: (a) a balanced DISCHARGE current may be achieved by adding another filter C to cover the whole image sensor (in daddition to filter A and filter B); (b) filter C may have a transmittance of 1 in the passband of filter A; and (c) filter C may have a transmittance of $(I_1/I_2)$ in the passband of Filter B.

Similarly, in FIG. 1, if $(I_1/I_2)>1$, then: (a) a balanced DISCHARGE current may be achieved by adding another filter C to cover the whole image sensor (in addition to filter A and filter B); (b) filter C may have a transmittance of $(I_1/I_2)$ in the passband of filter A; and (c) filter C may have a transmittance of 1 in the passband of Filter B.

In the examples in the preceding two paragraphs, the transmittance of filter C may be any value at frequencies outside of the pass bands of filters A and B.

Balanced LDR Current

In the example shown in FIG. 2, the LDR curve (i.e., the resistance as a function of incident radiant flux) of the LDR (light-dependent resistor) may be set in such a way that the electrical current (which flows from the photodiode PD to ground through the LDR) is substantially equal to the charge generated per unit of time in photodiode A due to ambient light. This in turn may cause ambient light to have substantially no effect on the measurement of irradiance by photodiode PD.

As used herein, "balanced LDR current" means an electrical current (which flows through the LDR to ground) that is substantially equal to the charge generated per unit of time in photodiode A due to ambient light. In FIG. 2, the balanced LDR current may flow from photodiode PD through the LDR to ground. In FIG. 3, the balanced LDR current may flow from floating diffusion FD through the LDR to ground.

The LDR curve which achieves balanced LDR current in FIGS. 2 and 3 may be determined in at least three ways: (1) by trial and error doping of the CMOS substrate of the LDR; (2) by electric simulation in design software where the doping (of the CMOS substrate of the LDR) is calculated theoretically; and (3) by calibrating with a constant ambient light.

In FIG. 2, calibrating the LDR curve with a constant ambient light may involve: (a) illuminating the image sensor with only a constant ambient light; (b) measuring $I_1$, which is the charge per unit of time generated in photodiode A while the image sensor is illuminated with only the constant ambient light; (c) measuring $I_2$, which is the electrical current flowing through the LDR (from the photodiode PD to ground) at some specified flux F of incident light on the LDR when the resistance of the LDR is 1 ohm; and (d) replacing (or modifying) the LDR in such a way that the new (or modified) LDR has a resistance that is substantially equal to $I_1/I_2$ ohms at flux F. Modifying the resistance of the LDR to be substantially equal to $I_1/I_2$ ohms at flux F may involve fabricating the LDR with proper doping to achieve the desired resistance.

Alternatively, in FIG. 2, a balanced LDR current may be achieved by changing the bandwidth of Filter B. For instance, in FIG. 2, filter B may be replaced by new filter B', in such a way that BD'=BD $(I_1/I_2)$, where BD' is the bandwidth of filter B' and where BD is the bandwidth of Filter B. In some cases, the passband of filter B' is very close to, but not overlapping, the passband of filter B. The bandwidth of filter B' may be wider than, or narrower than, the bandwidth of filter B.

Likewise, in FIG. 2, if $(I_1/I_2)<1$, then a balanced LDR current may be achieved by changing the transmittance of Filter B. For instance, in FIG. 2, if $(I_1/I_2)<1$, then filter B may be replaced by new filter B', in such a way that TC'=TC $(I_1/I_2)$, where TC' is the transmittance of Filter B' and where TC is the transmittance of Filter B.

Likewise, in FIG. 2, if $(I_1/I_2)<1$, then: (a) a balanced LDR current may be achieved by adding another filter C to cover the whole image sensor (in addition to filter A and filter B); (b) filter C may have a transmittance of 1 in the passband of filter A; and (c) filter C may have a transmittance of ($I_1/I_2$) in the passband of Filter B.

Similarly, in FIG. 2, if ($I_1/I_2$)>1, then: (a) a balanced LDR current may be achieved by adding another filter C to cover the whole image sensor (in addition to filter A and filter B); (b) filter C may have a transmittance of ($I_1/I_2$) in the passband of filter A; and (c) filter C may have a transmittance of 1 in the passband of Filter B.

In the examples in the preceding two paragraphs, the transmittance of filter C in FIG. 2 may be any value at frequencies outside of the passbands of filters A and B.

Each of the methods described in the preceding seven paragraphs may also be employed to achieve a balanced LDR current in FIG. 3.

Alternatively, in FIG. 3, a balanced LDR curve may be achieved by controlling when—in each frame—discharge (i.e., transfer of electric charge from photodiode PD to floating diffusion FD) begins, by controlling the timing of when transfer gate TX is ON. (TX is ON when it allows current to pass). This alternative approach may be desirable, in FIG. 3, if the LDR current is greater than amount of charge per unit of time being generated in photodiode PD due to ambient light. For instance, if the LDR current is two times greater than the amount of charge per unit of time being generated in photodiode PD due to ambient light, then in each frame the transfer gate TX may trigger discharge (allow current to pass from PD to FD) at the middle of the frame. Likewise, if the LDR current is three times greater than the amount of charge per unit of time being generated in photodiode PD due to ambient light, then in each frame the transfer gate TX may trigger discharge (allow current to pass from PD to FD) at a time that is two-thirds of the frame after the beginning of the frame.

In some cases, the following method is employed to determine an optimal trigger time for FIG. 3 (e.g., an optimal time, during each frame, to transfer charge from photodiode PD to floating diffusion FD). Illuminate the image sensor in FIG. 3 with only a unit flux of active light. Let V_active be the average per pixel flux that is measured by the image sensor, when the image sensor is illuminated with only a unit flux of active light. Then illuminate the image sensor in FIG. 3 with a unit flux of ambient light. Let V_ambient be the average per pixel flux that is measured by the image sensor, when the image sensor is illuminated with only a unit flux of ambient light. Then check that V_ambient is close to zero (e.g., not exceeding dark-current and thermal noise). In this example, V_ambient should be close to zero if the trigger time is set early enough in each frame to ensure that all charge that builds up in photodiode PD due to ambient light is discharged (via TX, FD and the LDR) and thus is not measured. In this example, if V_ambient is not close to zero, this may indicate that: (a) the image sensor is defective or (b) the trigger time has been set to occur too late in each frame. Then illuminate the image sensor withe one unit flux of ambient light and simultaneously k units flux of active light, beginning at k=1. Let V_k be the average per pixel flux that is measured by the image sensor, when the image sensor is illuminated with a unit flux of ambient light and simultaneously k units flux of active light. If V_k is lower than V_active/2, increase k by one and repeat. Otherwise, calculate p=V_k/(V_active*k) and set the TX signal in such a way that discharge (i.e., transfer of charge from photodiode PD through TX to floating diffusion FD) is triggered, during each frame, after (1-$p$)*frame time has elapsed since the beginning of the frame, where frame time (or frame time) is the duration of each frame. In this paragraph "*" is the multiplication operator.

More Details

In each example described herein, where a first amount is proportional to a second amount, the first amount may instead be substantially proportional to the second amount throughout a time period. For instance, in each example herein described herein, wherein the amount of charge depleted from a floating diffusion is proportional to irradiance incident on an LDR, the amount of charge depleted from the floating diffusion may, throughout a time period, instead be substantially proportional to irradiance incident on the LDR.

In each example described herein, wherein a first item decreases by a first amount that is proportional (or substantially proportional) to a second amount, the first amount may be expressed as a positive number. For instance, if x decreases from 9 to 4, the amount of the decrease may be expressed as 5. Likewise, in each example described herein, where an amount of electrical charge is discharged, drained or depleted, this amount (which is discharged, drained or depleted) may be expressed as a positive number.

In each example described herein, where a first item decreases by a first amount that is proportional to a second amount by which a second item increases, the first amount may instead decrease strictly monotonically while the second amount increases strictly monotonically. In each example described herein, where a first item decreases by a first amount that is proportional to a second amount by which a second item increases, the first amount may instead decrease weakly monotonically while the second amount increases weakly monotonically. In this paragraph, the terms "strictly monotonic" and "weakly monotonic" are used in the mathematical sense of those terms.

In illustrative implementations, when electrical charge is discharged, drained or otherwise reduced, the amount of discharge, drain or reduction in charge is not measured.

Each "frame" that is described herein may be a period of time during which, or throughout which, a measurement of light incident on a pixel is taken (or during which, or throughout which, measurements of light incident on pixels of a camera are taken).

Non-limiting examples of electrical charge being discharged, drained, depleted, or reduced "frequently" include discharging, draining, depleting or reducing charge: (a) 1, 2, 3, 4, 5, 6, 7, 8, 9, or 10 times per frame; (b) at least eleven times per frame; (c) at least 20 times per frame; (d) at least 30 times per frame; or (e) at least 40 times per frame.

In some implementations of this invention: (a) a photoresistor (also called an LDR or light-dependent resistor) has a light-dependent resistance that controls the amperage of an electrical current that depletes electrical charge; and (b) the photoresistor's response to changes in light intensity exhibits latency. For instance, in some cases, it takes up to a second, after the photoresistor is placed in complete darkness, for the resistance of the photoresistor to increase back to its initial value. Likewise, in some cases, it takes up to ten milliseconds for the resistance of the photoresistor to fully decrease when intense light is applied after the photoresistor has been in complete darkness. Furthermore, in some implementations of this invention, each photodiode has a non-zero response time to incident light.

In some implementations of this invention: (a) each pixel has a configuration shown in FIG. 1; and (b) the rate of depletion of electric charge from photodiode A is controlled in such a way that the rate of depletion depends on both the present irradiance and previous irradiance of light incident on photodiode B. Put differently, in some cases, the system which controls the rate of depletion in FIG. 1 has memory. This is because the voltage of the transistor (which controls the current that depletes the charge from photodiode A in FIG. 1) may depend on charge that has built up in photodiode B over a period of time. This is also because the photoresistor exhibits latency in its response to incident light.

In some implementations of this invention: (a) each pixel has a configuration shown in FIG. 2 or FIG. 3; and (b) the rate of depletion of electric charge is controlled in such a way that the rate of depletion depends on present irradiance of light incident on photodiode B. Put differently, in some cases, the system which controls the rate of depletion in FIG. 2 and FIG. 3 has, for practical purposes, no memory. This is because the resistance of the photoresistor (which controls the current that depletes the charge from floating diffusion in FIG. 2 and FIG. 3) may depend on present irradiance incident on the photoresistor. This also because the response time of the photoresistor to changes in irradiance may be so fast that, for many practical purposes, the photoresistor has no memory.

In FIGS. 1, 2 and 3, other factors in addition to incident light (such as temperature) may affect the amount and rate of charge generated by photodiodes A and B. Likewise, in FIGS. 2 and 3, other factors in addition to incident light (such as temperature) may affect the resistance of the photoresistor.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

As used herein, "active light source" means a light source that comprises a laser, light-emitting diode (LED), organic LED, polymer LED, or other solid-state light source.

As used herein, "active light" means light emitted by an active light source.

Unless the context clearly indicates otherwise, the upper and lower cutoff frequencies of a frequency "band" are half-power points. Likewise, unless the context clearly indicates otherwise, the upper and lower cutoff frequencies of a "passband" are half-power points.

To compute "based on" specified data means to perform a computation that takes the specified data as an input.

"BJT" means bipolar junction transistor.

As used herein, "charge" means electrical charge.

The term "comprise" (and grammatical variations thereof) shall be construed as if followed by "without limitation". If A comprises B, then A includes B and may include other things.

A non-limiting example of X being "configured" to do Y occurs when X has material properties that cause Y to occur. For instance, if an optical filter has material properties that cause the filter to have a particular passband, the filter is configured to have that passband (as the term "configured" is used herein).

A non-limiting example of X "controlling" Y occurs when X is one of multiple factors that together control Y. For instance, if the electrical resistance of a photoresistor depends on both temperature and irradiance of incident light, then the irradiance "controls" the resistance (as the term "control" is used herein).

As used herein, "depends on" means depends at least in part on.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

As used herein, unless the context clearly indicates otherwise, "connected" means electrically connected. For instance, a non-limiting example of circuit element A being "connected" to circuit element B occurs when a wire connects elements A and B and forms a path by which electric current may flow between elements A and B.

A non-limiting example of an optical filter that "covers" a circuit element is a filter that is configured in such a way that light incident on the circuit element has passed through the filter.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

As used herein, the noun "filter" means an optical filter.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

As used herein, "intensity" means any radiometric or photometric measure of intensity, energy or power. Each of the following is a non-limiting example of "intensity" of light: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure, radiant energy density, luminance, luminous intensity, luminous energy, luminous flux, luminous power, illuminance, luminous exitance, luminous emittance, luminous exposure, and luminous energy density.

To say that a first frequency band "intersects" a second frequency band means that the first frequency band includes at least one frequency that is also included in the second frequency band. To say that a first passband "intersects" a second passband means that the first passband includes at least one frequency that is also included in the second passband.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

"MOSFET" means metal-oxide-semiconductor field-effect transistor.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

"RAL" means the RAL color standard.

As used herein, the term "set" does not include a group with no elements.

Unless the context clearly indicates otherwise, "some" means one or more.

As used herein, a "subset" of a set consists of less than all of the elements of the set.

To say that A and B are "substantially proportional" over a period of time means that a proportionality constant K varies by no more 10% throughout the period of time, where: (a) the proportionality constant is equal to A divided by B; and (b) B is not equal to zero.

To say that A and B are "substantially equal" means that $|A-B|<0.1\ |B|$, where $|B|\geq|A|$.

The term "such as" means for example.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) generating electrical charge in a first photodiode of an imaging pixel at a rate of generation, which rate of generation depends on a first irradiance, which first irradiance is irradiance of light that has passed through a first optical filter and that is incident on the first photodiode; (b) depleting, at a rate of depletion, a first portion of the electric charge, in such a way that (i) the rate of depletion depends, at least in part, on a second irradiance, which second irradiance is irradiance of light that has passed through a second optical filter and that is incident on a second circuit element of the imaging pixel, and (ii) the depleting is from the first photodiode or from a third circuit element in which the electrical charge has been stored; and (c) reading out a remaining portion of the electrical charge, which remaining portion remains after the first portion is depleted; wherein (1) light incident on the imaging pixel comprises active light and ambient light, (2) irradiance of ambient light that has passed through the first optical filter and is incident on the first photodiode differs by less than 25% from irradiance of ambient light that has passed through the second optical filter and is incident on the second circuit element, (3) irradiance of active light that has passed through the second optical filter and is incident on the second circuit element is less than 25% of irradiance of active light that has passed through the first optical filter and is incident on the first photodiode, and (4) the depleting reduces or eliminates an effect that the ambient light would otherwise have on a measurement taken by the imaging pixel. In some cases: (a) the depleting is from the first photodiode; (b) the second circuit element is a second photodiode; and (c) electric charge that builds up in the second photodiode, in response to the light that passes through the second optical filter, controls voltage in a region of a transistor and thereby controls an electrical current that flows through the transistor and that depletes charge from the first photodiode. In some cases: (a) the depleting is from a floating diffusion that stores charge generated by the first photodiode; (b) the second circuit element is a photoresistor; and (c) the irradiance of light that has passed through the second optical filter and is incident on the photoresistor (i) controls electrical resistance of the photoresistor and (ii) thus controls amperage of an electrical current that flows through the photoresistor and depletes charge from the first photodiode. In some cases, the depleting and generating each occur continuously throughout a frame of the imaging pixel. In some cases, the depleting occurs at least once during each frame of the imaging pixel. In some cases, the depleting is simultaneous with the generating. In some cases, the rate of depletion is directly proportional to the irradiance incident on the second circuit element. In some cases, throughout a frame of the imaging pixel, the rate of depletion is substantially proportional to the irradiance incident on the second circuit element. In some cases, the rate of depletion is directly proportional to an amount of electrical charge that accumulates due to light incident on the second circuit element. In some cases, throughout a frame of the imaging pixel, the rate of depletion is substantially proportional to an amount of electrical charge that accumulates due to light incident on the second circuit element. In some cases, the rate of depletion tends to increase weakly monotonically when the rate of generation increases weakly monotonically. In some cases, peak frequency of the active light is in a frequency band, which frequency band (a) has cut-off frequencies at half-power points and (b) has a bandwidth of less than five nanometers. In some cases: (a) the active light has a peak frequency in a frequency band, which frequency band (i) has cut-off frequencies at half-power points and (ii) has a bandwidth of less than five nanometers; (b) the first optical filter has a passband; and (c) the passband of the first optical filter includes at least one frequency that is in the frequency band of the active light. In some cases: (a) the active light has a peak frequency in a frequency band, which frequency band (i) has cut-off frequencies at half-power points and (ii) has a bandwidth of less than five nanometers; (b) the first optical filter has a passband that intersects the frequency band of the active light; and (c) the second optical filter has a passband that does not intersect the frequency band of the active light. In some cases, the method also comprises emitting, from an active light source, the active light. In some cases: (a) the imaging pixel is one of set of multiple imaging pixels in a camera; and (b) the method also comprises performing, in each other pixel in the set, the generating and the depleting. Each of the cases described above in this paragraph is an example of the method described in the first sentence of this paragraph, and is also an example of an embodiment of this invention that may be combined with other embodiments of this invention.

In some implementations, this invention is a method comprising, for each particular imaging pixel in a set of imaging pixels in a camera: (a) generating electrical charge in a first photodiode of the particular pixel in response to light passes through a first optical filter and strikes the first photodiode; (b) depleting from the first photodiode, at a rate of depletion, a first portion of the electric charge, in such a way that the rate of depletion depends on voltage in a region of a transistor, which voltage (i) controls amperage of an electrical current that flows from the first photodiode through the transistor during the depleting, and (ii) is controlled by electrical charge that is generated in a second photodiode of the particular pixel in response to light that passes through a second optical filter and strikes the second photodiode; and (c) reading out a remaining portion of the electrical charge, which remaining portion remains after the first portion is depleted; wherein (1) light incident on the particular pixel comprises active light and ambient light, (2) irradiance of ambient light that has passed through the first optical filter and is incident on the first photodiode differs by less than 25% from irradiance of ambient light that has passed through the second optical filter and is incident on the second photodiode, (3) irradiance of active light that has passed through the second optical filter and is incident on the second photodiode is less than 25% of irradiance of active light that has passed through the first optical filter and is incident on the first photodiode, and (4) the depleting reduces or eliminates an effect that the ambient light would otherwise have on a measurement taken by the particular pixel. In some cases, the depleting and generating each occur continuously throughout a frame of the camera. In some cases, the depleting occurs at least once during each frame of the camera. In some cases, the depleting is simultaneous with the generating. In some cases, the rate of depletion is directly proportional to the voltage. In some cases, throughout a frame of the camera, the rate of depletion is substantially proportional to the voltage. In some cases: (a) the generating occurs at a rate of generation; and (b) the rate of depletion tends to increase weakly monotonically when the rate of generation increases weakly monotonically. In some cases, peak frequency of the active light is in a frequency band, which frequency band (a) has cut-off frequencies at half-power points and (b) has a bandwidth of less than five nanometers. In some cases, peak frequency of the active light is in a frequency band, which frequency band (a) has cut-off frequencies at half-power points and (b) has a bandwidth of less than three nanometers. In some cases: (a) the active light has a peak frequency in a frequency band, which frequency band (i) has cut-off frequencies at half-power points and (ii) has a bandwidth of less than five nanometers; (b) the first optical filter has a passband; and (c) the passband of the first optical filter includes at least one frequency that is in the frequency band of the active light. In some cases: (a) the active light has a peak frequency in a frequency band, which frequency band (i) has cut-off frequencies at half-power points and (ii) has a bandwidth of less than five nanometers; (b) the first optical filter has a passband that intersects the frequency band of the active light; and (c) the second optical filter has a passband that does not intersect the frequency band of the active light. In some cases, the method also comprises emitting, from an active light source, the active light. Each of the cases described above in this paragraph is an example of the method described in the first sentence of this paragraph, and is also an example of an embodiment of this invention that may be combined with other embodiments of this invention.

In some implementations, this invention is a method comprising, for each particular imaging pixel in a set of imaging pixels in a camera: (a) generating electrical charge in a photodiode of the particular pixel in response to light has passed through a first optical filter and is incident on the photodiode; (b) depleting, at a rate of depletion, a first portion of the electric charge, in such a way that the rate of depletion depends on irradiance of light that has passed through a second optical filter and is incident on a photoresistor of the particular pixel; and (c) reading out a remaining portion of the electrical charge, which remaining portion remains after the first portion is depleted; wherein (1) the depleting is from a floating diffusion that stores charge generated by the photodiode, (2) the photoresistor has a light-dependent resistance that controls amperage of an electrical current that flows from the floating diffusion through the photoresistor during the depleting, (3) light incident on the particular pixel comprises active light and ambient light, (4) irradiance of ambient light that has passed through the first optical filter and is incident on the photodiode differs by less than 25% from irradiance of ambient light that has passed through the second optical filter and is incident on the photoresistor, (5) irradiance of active light that has passed through the second optical filter and is incident on the photoresistor is less than 25% of irradiance of active light that has passed through the first optical filter and is incident on the photodiode, and (6) the depleting reduces or eliminates an effect that the ambient light would otherwise have on a measurement taken by the particular pixel. In some cases, the depleting and generating each occur continuously throughout a frame of the camera. In some cases, the depleting occurs at least once during each frame of the camera. In some cases, the depleting is simultaneous with the generating. In some cases: (a) the generating occurs at a rate of generation; (b) the rate of generation depends on irradiance of light that has passed through the first optical filter and is incident on the photodiode; and (c) the rate of depletion is directly proportional to the rate of generation. In some cases: (a) the generating occurs at a rate of generation; (b) the rate of generation depends on irradiance of light that has passed through the first optical filter and is incident on the photodiode; and (c) throughout a frame of the camera, the rate of depletion is substantially proportional to the rate of generation. In some cases: (a) the generating occurs at a rate of generation; (b) the rate of generation depends on irradiance of light that has passed through the first optical filter and is incident on the photodiode; and (c) the rate of depletion tends to increase weakly monotonically when the rate of generation increases weakly monotonically. In some cases, peak frequency of the active light is in a frequency band, which frequency band (a) has cut-off frequencies at half-power points and (b) has a bandwidth of less than five nanometers. In some cases: (a) the active light has a peak frequency in a frequency band, which frequency band (i) has cut-off frequencies at half-power points and (ii) has a bandwidth of less than five nanometers; (b) the first optical filter has a passband; and (c) the passband of the first optical filter includes at least one frequency that is in the frequency band of the active light. In some cases: (a) the active light has a peak frequency in a frequency band, which frequency band (i) has cut-off frequencies at half-power points and (ii) has a bandwidth of less than five nanometers; (b) the first optical filter has a passband that intersects the frequency band of the active light; and (c) the second optical filter has a passband that does not intersect the frequency band of the active light. In some cases, the method also comprises emitting, from an active light source, the active light. Each of the cases described above in this paragraph is an example of the method described in the first sentence of this paragraph, and is also an example of an embodiment of this invention that may be combined with other embodiments of this invention.

In some implementations, this invention is a camera comprising a set of imaging pixels, wherein, for each particular imaging pixel in the set: (a) the particular pixel includes a first photodiode, a second photodiode, a first optical filter and a second optical filter; (b) the first photodiode is configured to perform generation of electrical charge in response to light that passes through the first optical filter and strikes the first photodiode; (c) the camera is configured to deplete from the first photodiode, at a rate of depletion, a first portion of the electric charge, in such a way that the rate of depletion depends on voltage in a region of a transistor, which transistor is part of the camera; (d) the camera is configured in such a way that the voltage in a region of the transistor (i) controls amperage of an electrical current that flows from the first photodiode through the transistor during the depletion, and (ii) is controlled by electrical charge that is generated in the second photodiode in response to light that passes through the second optical filter and strikes the second photodiode; and (e) the camera is configured to read out a remaining portion of the electrical charge, which remaining portion remains after the first portion is depleted; wherein (1) the first and second optical filters are configured in such a way that (i) irradiance of ambient light that has passed through the first optical filter and is incident on the first photodiode differs by less than 25% from irradiance of ambient light that has passed through the second optical filter and is incident on the second photodiode, and (ii) irradiance of active light that has passed through the second optical filter and is incident on the second photodiode is less than 25% of irradiance of active light that has passed through the first optical filter and is incident on the first photodiode, and (2) the camera is configured in such a way that the depletion of the first portion of the charge reduces or eliminates an effect that the ambient light would otherwise have on a measurement taken by the particular pixel. In some cases, the camera is configured in such a way that the depletion and generation each occur continuously throughout a frame of the camera. In some cases, the camera is configured in such a way that the depletion occurs at least once during each frame of the camera. In some cases, the camera is configured in such a way that the depletion is simultaneous with the generation. In some cases, the camera is configured in such a way that the rate of depletion is directly proportional to the voltage. In some cases, the camera is configured in such a way that, throughout a frame of the camera, the rate of depletion is substantially proportional to the voltage. In some cases, the camera is configured in such a way that: (a) the generation occurs at a rate of generation; and (b) the rate of depletion tends to increase weakly monotonically when the rate of generation increases weakly monotonically. In some cases, the first optical filter has a passband that intersects a frequency band of the active light, which frequency band of the active light has a bandwidth of less than five nanometers. In some cases: (a) the first optical filter has a passband that intersects a frequency band of the active light, which frequency band of the active light has a bandwidth of less than five nanometers; and (b) the second optical filter has a passband that does not intersect the frequency band of the active light. In some cases: (a) the camera also includes an active light source; and (b) the active light source is configured to emit the active light. Each of the cases described above in this paragraph is an example of the camera described in the first sentence of this paragraph, and is also an example of an embodiment of this invention that may be combined with other embodiments of this invention.

In some implementations, this invention is a camera comprising a set of imaging pixels, wherein, for each particular imaging pixel in the set: (a) the particular pixel includes a photodiode, a photoresistor, a first optical filter and a second optical filter; (b) the photodiode is configured to perform generation of electrical charge in response to light that passes through the first optical filter and strikes the photodiode; (c) the camera is configured to deplete, at a rate of depletion, a first portion of the electric charge, in such a way that the rate of depletion depends on irradiance of light that has passed through the second optical filter and is incident on the photoresistor; (d) the camera is configured to perform the depletion in such a way that the depletion is from a floating diffusion, which floating diffusion is part of the camera and is configured to temporarily store charge generated by the photodiode; (e) the photoresistor has a light-dependent resistance; (f) the camera is configured in such a way that the light-dependent resistance of the photoresistor controls amperage of an electrical current that flows from the floating diffusion through the photoresistor during the depletion; and (g) the camera is configured to read out a remaining portion of the electrical charge, which remaining portion remains after the first portion is depleted; wherein (1) the first and second optical filters are configured in such a way that (i) irradiance of ambient light that has passed through the first optical filter and is incident on the photodiode differs by less than 25% from irradiance of ambient light that has passed through the second optical filter and is incident on the photoresistor, and (ii) irradiance of active light that has passed through the second optical filter and is incident on the photoresistor is less than 25% of irradiance of active light that has passed through the first optical filter and is incident on the photodiode, and (2) the camera is configured in such a way that the depletion of the first portion of the charge reduces or eliminates an effect that the ambient light would otherwise have on a measurement taken by the particular pixel. In some cases, the camera is configured in such a way that the depletion and generation each occur continuously throughout a frame of the camera. In some cases, the camera is configured in such a way that the depletion occurs at least once during each frame of the camera. In some cases, the camera is configured in such a way that the depletion is simultaneous with the generation. In some cases, the camera is configured in such a way that: (a) the generation occurs at a rate of generation; (b) the rate of generation depends on irradiance of light that has passed through the first optical filter and is incident on the photodiode; and (c) the rate of depletion is directly proportional to the rate of generation. In some cases: (a) the generation occurs at a rate of generation; (b) the rate of generation depends on irradiance of light that has passed through the first optical filter and is incident on the photodiode; and (c) throughout a frame of the particular pixel, the rate of depletion is substantially proportional to the rate of generation. In some cases, the camera is configured in such a way that: (a) the generation occurs at a rate of generation; and (b) the rate of depletion tends to increase weakly monotonically when the rate of generation increases weakly monotonically. In some cases, the first optical filter has a passband that intersects a frequency band of the active light, which frequency band of the active light has a bandwidth of less than five nanometers. In some cases: (a) the first optical filter has a passband that intersects a frequency band of the active light, which frequency band of the active light has a bandwidth of less than five nanometers; and (b) the second optical filter has a passband that does not intersect the frequency band of the active light. In some cases: (a) the camera also includes an active light source; and (b) the active light source is configured to emit the active light. Each of the cases described above in this paragraph is an example of the camera described in the first sentence of this paragraph, and is also an example of an embodiment of this invention that may be combined with other embodiments of this invention.

Each description herein of any method, apparatus or system of this invention describes a non-limiting example of this invention. This invention is not limited to those examples, and may be implemented in other ways.

Each description herein of any prototype of this invention describes a non-limiting example of this invention. This invention is not limited to those examples, and may be implemented in other ways.

Each description herein of any implementation, embodiment or case of this invention (or any use scenario for this invention) describes a non-limiting example of this invention. This invention is not limited to those examples, and may be implemented in other ways.

Each Figure, diagram, schematic or drawing herein that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

The invention claimed is:

1. A method comprising:
   (a) generating electrical charge in a first photodiode of an imaging pixel at a rate of generation, which rate of generation depends on a first irradiance, which first irradiance is irradiance of light that has passed through a first optical filter and that is incident on the first photodiode;
   (b) depleting, at a rate of depletion, a first portion of the electric charge, in such a way that
      (i) the rate of depletion depends, at least in part, on a second irradiance, which second irradiance is irradiance of light that has passed through a second optical filter and that is incident on a second circuit element of the imaging pixel, wherein the second circuit element is a photoresistor,
      (ii) the depleting is from the first photodiode or from a third circuit element in which the electrical charge has been stored,
      (iii) the depleting is from a floating diffusion that stores charge generated by the first photodiode; and
   (c) reading out a remaining portion of the electrical charge, which remaining portion remains after the first portion is depleted;
wherein
   (1) light incident on the imaging pixel comprises active light and ambient light,
   (2) irradiance of ambient light that has passed through the first optical filter and is incident on the first photodiode differs by less than 25% from irradiance of ambient light that has passed through the second optical filter and is incident on the second circuit element,
   (3) irradiance of active light that has passed through the second optical filter and is incident on the second circuit element (i) is less than 25% of irradiance of active light that has passed through the first optical filter and is incident on the first photodiode, (ii) controls electrical resistance of the second circuit element and (iii) thus controls amperage of an electrical current that flows through the second circuit element and depletes charge from the first photodiode, and
   (4) the depleting reduces or eliminates an effect that the ambient light would otherwise have on a measurement taken by the imaging pixel.

2. The method of claim 1, wherein the depleting and generating each occur continuously throughout a frame of the imaging pixel.

3. The method of claim 1, wherein the depleting occurs at least once during each frame of the imaging pixel.

4. The method of claim 1, wherein the depleting is simultaneous with the generating.

5. The method of claim 1, wherein the rate of depletion is directly proportional to the irradiance incident on the second circuit element.

6. The method of claim 1, wherein, throughout a frame of the imaging pixel, the rate of depletion is substantially proportional to the irradiance incident on the second circuit element.

7. The method of claim 1, wherein the rate of depletion is directly proportional to an amount of electrical charge that accumulates due to light incident on the second circuit element.

8. The method of claim 1, wherein, throughout a frame of the imaging pixel, the rate of depletion is substantially proportional to an amount of electrical charge that accumulates due to light incident on the second circuit element.

9. The method of claim 1, wherein the rate of depletion tends to increase weakly monotonically when the rate of generation increases weakly monotonically.

10. The method of claim 1, wherein peak frequency of the active light is in a frequency band, which frequency band (a) has cut-off frequencies at half-power points and (b) has a bandwidth of less than five nanometers.

11. The method of claim 1, wherein:
(a) the active light has a peak frequency in a frequency band, which frequency band (i) has cut-off frequencies at half-power points and (ii) has a bandwidth of less than five nanometers;
(b) the first optical filter has a passband; and
(c) the passband of the first optical filter includes at least one frequency that is in the frequency band of the active light.

12. The method of claim 1, wherein:
(a) the active light has a peak frequency in a frequency band, which frequency band (i) has cut-off frequencies at half-power points and (ii) has a bandwidth of less than five nanometers;
(b) the first optical filter has a passband that intersects the frequency band of the active light; and
(c) the second optical filter has a passband that does not intersect the frequency band of the active light.

13. The method of claim 1, wherein the method also comprises emitting, from an active light source, the active light.

14. The method of claim 1, wherein:
(a) the imaging pixel is one of set of multiple imaging pixels in a camera; and
(b) the method also comprises performing, in each other pixel in the set, the generating and the depleting.

15. A camera comprising a set of imaging pixels, wherein, for each particular imaging pixel in the set:
(a) the particular pixel includes a photodiode, a photoresistor, a first optical filter and a second optical filter;
(b) the photodiode is configured to perform generation of electrical charge in response to light that passes through the first optical filter and strikes the photodiode;
(c) the camera is configured to deplete, at a rate of depletion, a first portion of the electric charge, in such a way that the rate of depletion depends on irradiance of light that has passed through the second optical filter and is incident on the photoresistor;
(d) the camera is configured to perform the depletion in such a way that the depletion is from a floating diffusion, which floating diffusion is part of the camera and is configured to temporarily store charge generated by the photodiode;
(e) the photoresistor has a light-dependent resistance;
(f) the camera is configured in such a way that the light-dependent resistance of the photoresistor controls amperage of an electrical current that flows from the floating diffusion through the photoresistor during the depletion; and
(g) the camera is configured to read out a remaining portion of the electrical charge, which remaining portion remains after the first portion is depleted;

wherein
(1) the first and second optical filters are configured in such a way that
(i) irradiance of ambient light that has passed through the first optical filter and is incident on the photodiode differs by less than 25% from irradiance of ambient light that has passed through the second optical filter and is incident on the photoresistor, and
(ii) irradiance of active light that has passed through the second optical filter and is incident on the photoresistor is less than 25% of irradiance of active light that has passed through the first optical filter and is incident on the photodiode, and
(2) the camera is configured in such a way that the depletion of the first portion of the charge reduces or eliminates an effect that the ambient light would otherwise have on a measurement taken by the particular pixel.

16. The camera of claim 15, wherein the camera is configured in such a way that the depletion and generation each occur continuously throughout a frame of the camera.

17. The camera of claim 15, wherein the camera is configured in such a way that the depletion occurs at least once during each frame of the camera.

18. The camera of claim 15, wherein the camera is configured in such a way that the depletion is simultaneous with the generation.

19. The camera of claim 15, wherein the camera is configured in such a way that:
(a) the generation occurs at a rate of generation;
(b) the rate of generation depends on irradiance of light that has passed through the first optical filter and is incident on the photodiode; and
(c) the rate of depletion is directly proportional to the rate of generation.

20. The camera of claim 15, wherein the camera is configured in such a way that:
(a) the generation occurs at a rate of generation; and
(b) the rate of depletion tends to increase weakly monotonically when the rate of generation increases weakly monotonically.

21. The camera of claim 15, wherein the first optical filter has a passband that intersects a frequency band of the active light, which frequency band of the active light has a bandwidth of less than five nanometers.

22. The camera of claim 15, wherein:
(a) the first optical filter has a passband that intersects a frequency band of the active light, which frequency band of the active light has a bandwidth of less than five nanometers; and
(b) the second optical filter has a passband that does not intersect the frequency band of the active light.

23. The camera of claim 15, wherein:
(a) the camera also includes an active light source; and
(b) the active light source is configured to emit the active light.

* * * * *